United States Patent
Tschernoster et al.

(10) Patent No.: US 7,627,415 B2
(45) Date of Patent: Dec. 1, 2009

(54) DEVICE AND METHOD FOR SECURING THE STANDSTILL OF A MOTOR VEHICLE

(75) Inventors: Oliver Tschernoster, Munich (DE); Carsten Hass, Oberding (DE); Sonja de Castro Bonfim, Munich (DE); Leander Kempenaars, Munich (DE); Christian Scheinost, Ergolding (DE); Bartono Adiprasito, Neuching (DE); Maria-Christina Laiou, Munich (DE); Andreas Pfeiffer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/024,444

(22) Filed: Feb. 1, 2008

(65) Prior Publication Data

US 2008/0215224 A1    Sep. 4, 2008

Related U.S. Application Data

(63) Continuation of application No. PCT/EP2006/007235, filed on Jul. 22, 2006.

(30) Foreign Application Priority Data

Aug. 2, 2005  (DE) ................ 10 2005 036 217

(51) Int. Cl.
*B60T 7/12* (2006.01)
*B60T 8/32* (2006.01)

(52) U.S. Cl. .................. 701/96; 701/70; 701/93; 303/121; 303/167; 477/182; 477/186; 477/187; 477/190

(58) Field of Classification Search .......... 701/70, 701/93, 96; 303/121, 125, 167; 477/182, 477/186, 187, 190

See application file for complete search history.

(56) References Cited

U.S. PATENT DOCUMENTS 6,370,466 B1 *    4/2002    Hada et al. ................ 701/70

(Continued)

FOREIGN PATENT DOCUMENTS

DE    198 31 541 A1    3/2000

(Continued)

OTHER PUBLICATIONS

DE 10248813 Translation.*

(Continued)

*Primary Examiner*—Thomas G Black
*Assistant Examiner*—Ce Li
(74) *Attorney, Agent, or Firm*—Crowell & Moring LLP

(57) ABSTRACT

In a device for securing the standstill of a motor vehicle with a distance-related longitudinal dynamic control module, which is contained in at least one electronic control unit and by which the motor vehicle is decelerated down to a standstill while maintaining a defined distance from a target object, at least until reaching the standstill, a nominal brake torque is defined by the longitudinal dynamic control module for a brake control module. At a defined first time after a detected standstill of the motor vehicle, the longitudinal dynamic control module transmits a transfer signal to the brake control module. Thereupon, independently of the predefinition of a nominal brake torque by the longitudinal dynamic control module, the brake control module alone builds up and/or holds a wheel brake torque in the sense of a parking brake function. At a defined second time after a start command, the longitudinal dynamic control module defines again, by itself, a nominal brake torque, starting at the actual brake torque that is on hand at this time, for the purpose of decreasing the wheel brake torque.

18 Claims, 2 Drawing Sheets

U.S. PATENT DOCUMENTS

| | | |
|---|---|---|
| 6,701,242 B1 | 3/2004 | Diebold |
| 6,878,096 B1 * | 4/2005 | Winner et al. .................. 477/94 |
| 6,994,407 B2 * | 2/2006 | Kinder et al. ............... 303/191 |
| 7,184,874 B2 * | 2/2007 | Michi et al. ................... 701/96 |
| 2005/0038591 A1 | 2/2005 | Michi et al. |

FOREIGN PATENT DOCUMENTS

| | | |
|---|---|---|
| DE | 198 38 885 A1 | 3/2000 |
| DE | 199 31 345 A1 | 12/2000 |
| DE | 100 63 062 A1 | 6/2002 |
| DE | 101 52 632 A1 | 5/2003 |
| DE | 102 38 870 A1 | 3/2004 |
| DE | 102 48 813 A1 | 6/2004 |
| EP | 1 410 940 B1 | 4/2004 |
| WO | WO 03/039925 A1 | 5/2003 |

OTHER PUBLICATIONS

International Search Report dated Nov. 6, 2006 with English translation (Four (4) Pages).

German Search Report dated Apr. 5, 2006 with English translation of relevant portion (Nine (9) Pages).

* cited by examiner

DEVICE AND METHOD FOR SECURING THE STANDSTILL OF A MOTOR VEHICLE

CROSS-REFERENCE TO RELATED APPLICATIONS

This application is a continuation of PCT International Application No. PCT/EP2006/007235, filed on Jul. 22, 2006, which claims priority under 35 U.S.C. §119 to German Application No. 10 2005 036 217.6, filed Aug. 2, 2005, the entire disclosures of which are expressly incorporated by reference herein.

BACKGROUND AND SUMMARY OF THE INVENTION

The invention relates to a device and method for securing the standstill of a motor vehicle with a distance-related longitudinal dynamic control module, which is contained in at least one electronic control unit and by which the motor vehicle is decelerated down to a standstill while maintaining a defined distance from a target object.

With respect to the technological environment reference is made to the German patent document DE 101 52 632 A1, as an example.

Vehicles that exhibit a speed controller with a distance sensing system already exist on the market. In particular, when driving on a highway or an expressway, such a vehicle tries to maintain a presetable travel speed, but reduces this speed when the vehicle approaches a vehicle that is traveling ahead (target object). Such a feature also gives the driver of the vehicle optimum comfort in bumper-to-bumper traffic, because the speed controller with a distance sensing system (for example, an ACC "Active Cruise Control") always maintains an adequate safety distance from the vehicle traveling ahead. If the vehicle traveling ahead accelerates, then the speed controller with the distance sensing system (hereinafter also referred to as an "ACC system") also accelerates the vehicle, which is provided with such a distance sensing system, and in particular until the set target speed or the speed of the vehicle traveling ahead (if it is driving more slowly than the target speed) is reached.

In addition to the ACC systems, which are operated predominantly on well-constructed roads in the higher speed range, there are also so-called stop & go systems that make possible a comparable driver assistance in the lower speed range down to as far as a standstill of the vehicle. These systems require not only a powerful close range sensing system, but also an electronically engagable brake system, which is capable of reliably holding the vehicle in the standstill phase and preventing the vehicle from continuing to roll, until the driver of the vehicle or the stop & go system itself has given a commensurate command to go (start command).

The invention improves such distance-related speed control systems with a stop & go function, on the one hand, in terms of comfort and, on the other hand, in terms of a fast response behavior.

According to the invention, a device is provided for securing a standstill of a motor vehicle with a distance-related longitudinal dynamic control module, which is contained in at least one electronic control unit and by which the motor vehicle is decelerated down to a standstill while maintaining a defined distance from a target object. The device is characterized in that at least until reaching the standstill, a nominal brake torque is defined by the longitudinal dynamic control module for a brake control module. At a defined first time after a detected standstill of the motor vehicle, the longitudinal dynamic control module transmits a transfer signal to the brake control module; whereupon independently of the predefinition of a nominal brake torque by the longitudinal dynamic control module, the brake control module alone builds up and/or holds a wheel brake torque in the sense of a parking brake function, and that at a defined second time after a start command, the longitudinal dynamic control module defines again, by itself for the brake control module, a nominal brake torque, starting at the actual brake torque that is on hand at this time, for the purpose of decreasing the wheel brake torque. Advantageous further developments are described and claimed herein.

Other objects, advantages and novel features of the present invention will become apparent from the following detailed description of the invention when considered in conjunction with the accompanying drawings.

DETAILED DESCRIPTION OF THE DRAWINGS

Figure 1:
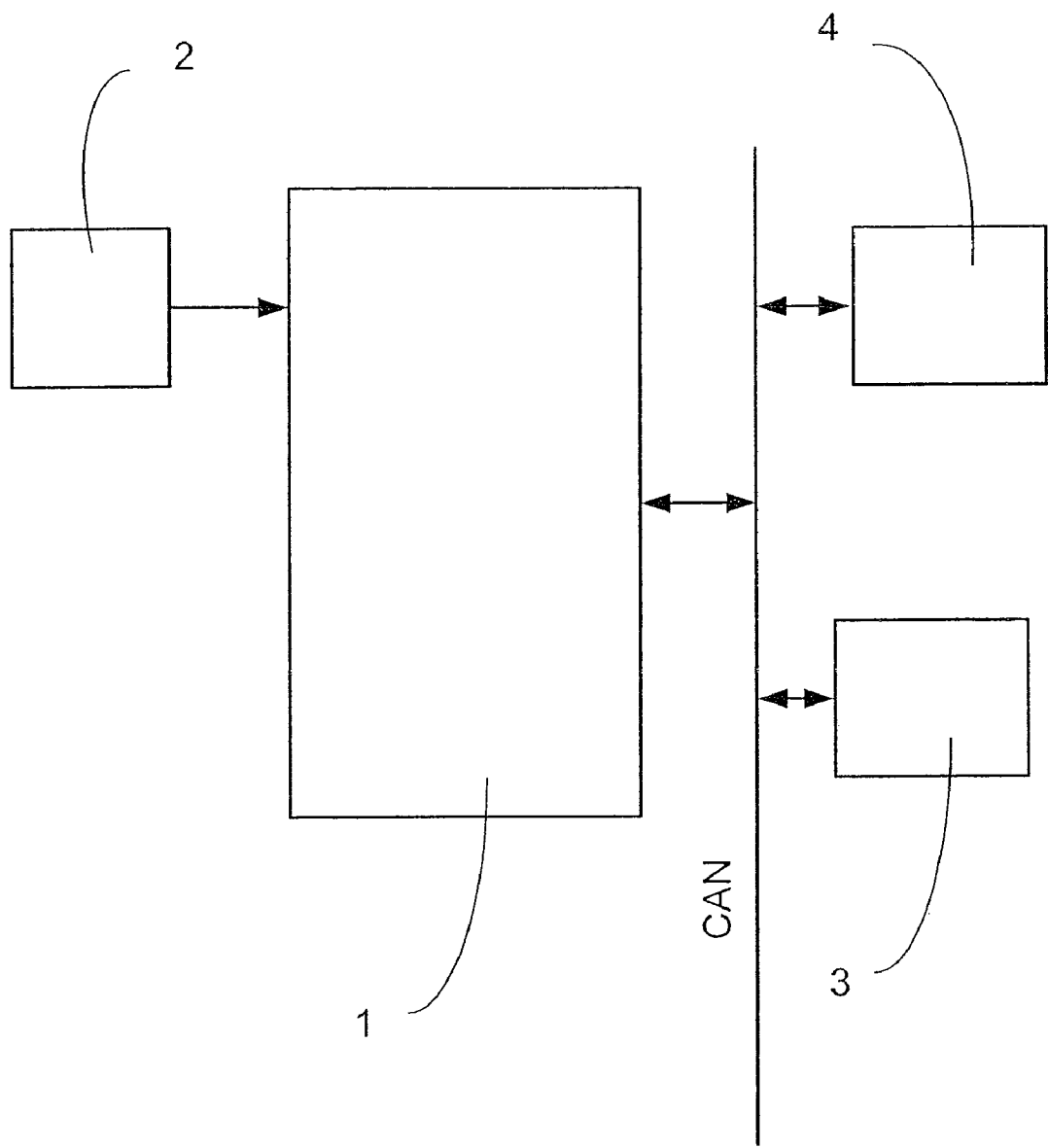
FIG. 1 is a schematic diagram providing an overview of the vehicle components that may be used for securing the standstill of the motor vehicle according to the invention.
Figure 2:
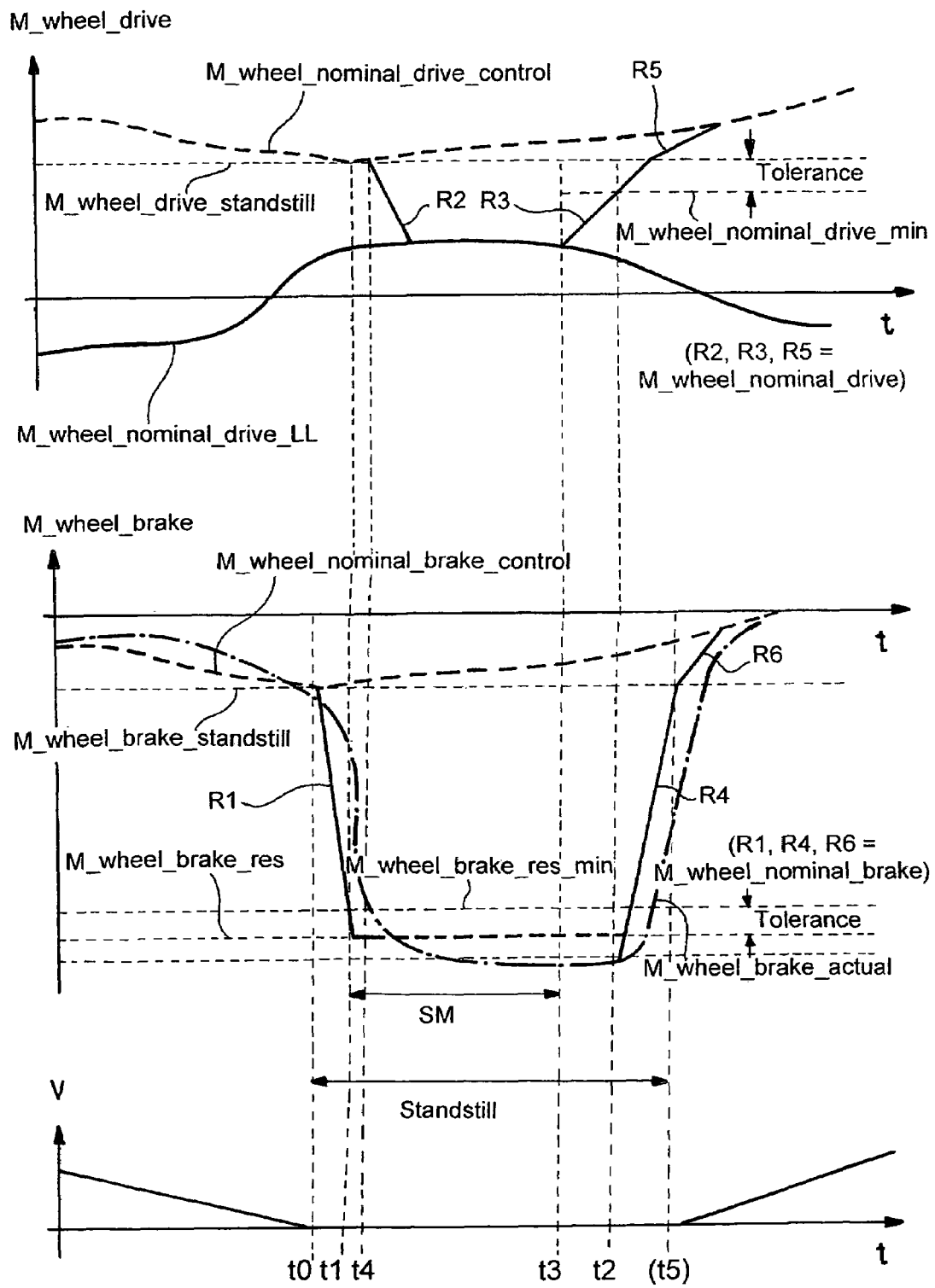
FIG. 2 are diagrams depicting the torque characteristics as a function of time, based on the performance of the inventive system.

The inventive device for ensuring the standstill of a motor vehicle exhibits, according to FIG. 1, a distance-related longitudinal dynamic control module 1, which is contained in a first electronic control unit and which is connected to a distance sensing system 2 and by which the motor vehicle can be decelerated down to a standstill of the vehicle while maintaining a defined distance from a target object. In order to maintain the defined distance or a preset travel speed, the longitudinal dynamic control module 1 outputs, for example, in a well-known manner, a nominal acceleration value, which in turn is converted into a nominal drive torque and/or a nominal brake torque, for example based on the wheel torques. The nominal drive torque (M_wheel_nominal_drive, M_wheel_nominal_drive_control; FIG. 2) is transmitted from the longitudinal dynamic control module 1, for example, over a databus link (e.g. a CAN bus) to a drive control unit 4 for controlling the drive engine and, if desired, a transmission. The nominal brake torque (M_wheel_nominal_brake, M_wheel_nominal_brake_control; FIG. 2) is also transmitted from the longitudinal dynamic control module 1, for example, over the CAN databus to a brake control module 3 for controlling a brake control system (ASC or DSC brake system (for example, of a BMW vehicle) or a parking brake).

In FIG. 2 the top diagram plots the drive torque (M_wheel_drive); the center diagram plots the brake torque (M_wheel_brake); and the bottom diagram plots the travel speed v over the time t. The dashed lines show the possible control variables, which are calculated by the longitudinal dynamic control module 1 for the nominal drive torque M_wheel_nominal_drive_control and for the nominal brake torque M_wheel_nominal_brake_control, as a function of the distance from the target object in the stop & go mode. These control variables are not converted for the duration of the inventive control of the drive torque (M_wheel_nominal_drive, for example, as a function of the ramps R2, R3 and R5) and for the duration of the inventive control of the brake torque (M_wheel_nominal_brake, for example as a function of the ramps R1, R4 and R6), in particular while standing still (solid lines).

Until the standstill at time t0 is reached, a nominal brake torque (M_wheel_nominal_brake_control) is defined by the longitudinal dynamic control module 1 for the brake control module 3. At a first defined time t1 after a detected standstill of the motor vehicle, the longitudinal dynamic control module 1 transmits a transfer signal to the brake control module 3. Then, independently of the predefinition of the nominal brake torque (M_wheel_nominal_brake) by the longitudinal dynamic control module 1, the brake control module 3 builds up and/or holds by itself a wheel brake torque in the sense of a parking brake function. The brake control module 3 confirms the transfer. This phase, in which the brake control module 3 alone sets, by itself, a brake torque, is also referred to below as the duration of the standstill management SM. The duration of the standstill management SM starts at the first time t1 (which will be discussed below in more detail) and terminates at time t3 of a start command. A start command can be a start request made by the driver (for example, by actuating a go/stop button) or an automatic start as soon as the target object drives off again. With the start command, the longitudinal dynamic control module 1 takes over again the predefinition of the torque. The brake module 3 confirms the takeover by the longitudinal dynamic control module 1, when the conditions for transferring the responsibility to the longitudinal dynamic control module 1 have been fulfilled. Otherwise, there is an error, upon which the brake control module 3 continues to hold the vehicle at a standstill.

Transferring the holding responsibility to the brake control module 3 guarantees that even in the event of an error in the longitudinal dynamic control module 1, the vehicle will continue to be held with certainty in the standstill mode.

At a defined second time t2 after the start command at time t3 (t3 could also be equal to t2; not illustrated here), the longitudinal dynamic control module 1 once again defines by itself for the brake control module 3 a nominal brake torque (M_wheel_nominal_brake) for decreasing the wheel brake torque—in this case as a function of the ramp R4—beginning at the actual brake torque (M_wheel_brake_actual) at this point in time.

Preferably, the first time t1 after a detected standstill t0 of the motor vehicle for the purpose of transmitting the transfer signal is defined on reaching a safety-nominal brake torque (M_wheel_brake_res), which is set by the brake control module 3 through the predefinition of the longitudinal dynamic control module 1 after a detected standstill. According to the embodiment illustrated here, the safety-nominal brake torque (M_wheel_brake_res) is set through the predefinition of a nominal brake torque (M_wheel_nominal_brake), as a function of the first ramp R1, after a detected standstill up to the first time t1. The time t1 could also be equal to the time t0 (not illustrated here), when instead of a ramp, a sudden actuation of a safety-nominal brake torque were to be specified. However, the ramp-shaped actuation is especially advantageous in terms of comfort.

Starting at the actual brake torque (M_wheel_brake_actual), which is present at the second time t2, the wheel brake torque is decreased through predefinition of a nominal brake torque (M_wheel_nominal_brake), as a function of the second ramp R4.

After the beginning of the first ramp R1, in order to guarantee a more reliable standstill, preferably after reaching a predefined minimum actual brake torque (M_wheel_brake_res_min) at time t4, which is located in a tolerance range above the safety-nominal brake torque (M_wheel_brake_res), the longitudinal dynamic control module 1 starts, based on the nominal drive torque (M_wheel_nominal_drive), a third ramp R2 for reducing the drive torque to an idle value (M_wheel_nominal_drive_LL).

Before the beginning of the second ramp R4, preferably directly after the start command at time t3, the longitudinal dynamic control module 1 begins a fourth ramp R3 in order to increase the drive torque.

The second time t2, after which the second ramp R4 begins, is defined on reaching a minimum drive torque (M_wheel_nominal_drive_min), which lies in a tolerance range below the nominal drive torque (wheel_drive_standstill), which was on hand at time t0 of the beginning of the standstill.

The decrease in the wheel brake torque, especially as a function of the second ramp R4, is specified at least up to the nominal brake torque (M_wheel_brake_standstill), which was on hand at time t0 of the beginning of the standstill.

Then, the increase in the drive torque, especially as a function of the fourth ramp R3, is specified at least up to the nominal drive torque (M_wheel_drive_standstill), which was on hand the beginning of the standstill at time t0.

In the illustrated example, the vehicle drives away again at time t5. Thus, the standstill (defined here by the vehicle speed v=0 km/h and/or v<vlimit, where vlimit is determined by the resolution of the speed sensors (for example, vlimit=0.1 km/h)) is terminated.

In order to structure the start operation in an optimally convenient manner, a fifth ramp R5 is specified, preferably starting from M_wheel_nominal_drive_min. This ramp runs until the nominal drive torque, which is defined thus, has reached the M_wheel_nominal_drive_control, calculated by the longitudinal dynamic control module 1 for the conventional control. After this point in time, this torque (M_wheel_nominal_drive_control) is passed on to the drive control unit 4 without any manipulation.

It is just as advantageous to specify a sixth ramp R6 for the brake control module 3 after execution of ramp R4. Starting from M_wheel_brake_standstill, the sixth ramp runs until it has reached the M_wheel_nominal_brake_control, calculated by the longitudinal dynamic control module 1 for the conventional control. After this point in time, this torque (M_wheel_nominal_brake_control) is passed on to the brake control unit 3 without any manipulation.

Owing to the transfer of the brake control by the longitudinal dynamic control module 1 to the brake control module 3 for the duration of the standstill management SM, and the subsequent takeover of the predefinition of the torque by the longitudinal dynamic control module 1 at startup, a concerted synchronous performance of the vehicle is achieved during the transitional phase from the normal driving mode into the standstill state and from the standstill state into the normal driving mode. Furthermore, owing to this transfer/takeover process during stop and start, a clear assignment of the functional responsibility can be defined. As a result, there is a better overview of the software programming of the functions in the respective modules; and the overall performance of the vehicle is more reliable.

The inventive execution of the ramps R1 and R2 guarantees, on the one hand, comfortable stopping and, on the other hand, safer parking brake action. The inventive execution and overlapping of the ramps R3 and R4 and the subsequent ramps R5 and R6 make possible a comfortable and relatively fast start.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for securing a standstill of a motor vehicle, comprising:
    a distance-related longitudinal dynamic control module by which the motor vehicle is capable of being decelerated down to the standstill while maintaining a defined distance from a target object;
    a brake control module;
    wherein at least until reaching the standstill, a nominal brake torque is defined by the longitudinal dynamic control module for the brake control module;
    wherein at a defined first time after the standstill of the motor vehicle is detected, the longitudinal dynamic control module transmits a transfer signal to the brake control module, whereupon the brake control module alone effects a wheel brake torque in a manner of a parking brake function independently of a predefinition of the nominal brake torque by the longitudinal dynamic control module;
    wherein at a defined second time after a start command, the longitudinal dynamic control module again defines, by itself, for the brake control module, a nominal brake torque, starting at an actual brake torque on hand at this time period, for decreasing the wheel brake torque, and
    wherein the defined first time after the standstill of the motor vehicle is detected is defined upon reaching a safety-nominal brake torque, set by the brake control module through predefinition of the longitudinal dynamic control module after the detected standstill.

2. The device according to claim 1, wherein the defined first time after the standstill of the motor vehicle is detected for transmitting the transfer signal is immediately after the standstill is detected.

3. The device according to claim 1, wherein the safety-nominal brake torque is set after the detected standstill until the defined first time through predefinition of a first ramp.

4. The device according to claim 1, wherein beginning at the actual brake torque at the defined second time, the wheel brake torque is decreased through predefinition of a second ramp.

5. The device according to claim 3, wherein, after beginning of the first ramp, the longitudinal dynamic control module starts, based on the nominal drive torque, a third ramp for reducing the drive torque to an idle value.

6. The device according to claim 5, wherein before beginning the second ramp, the longitudinal dynamic control module begins a fourth ramp in order to increase the drive torque.

7. The device according to claim 5, wherein the longitudinal dynamic control module starts the third ramp after reaching a predefined minimum actual brake torque after the beginning of the first ramp, which predefined minimal actual brake torque is located in a tolerance range above the safety-nominal brake torque.

8. The device according to claim 7, wherein the longitudinal dynamic control module begins a fourth ramp directly after the start command before the beginning of the second ramp.

9. The device according to claim 8, wherein the second time after the start command, after which the second ramp begins, is directly after the start command.

10. The device according to claim 8, wherein the second time after a start command, after which the second ramp begins, is defined upon reaching a minimum drive torque lying in a tolerance range below the nominal drive torque on hand at the beginning of the standstill of the motor vehicle.

11. The device according to claim 10, wherein the decrease in the wheel brake torque as a function of the second ramp is specified at least up to the nominal brake torque on hand at the beginning of the standstill of the motor vehicle.

12. The device according to claim 11, wherein the increase in the drive torque as a function of the fourth ramp is specified at least up to the nominal drive torque on hand at the beginning of the standstill of the motor vehicle.

13. A method for securing a standstill of a motor vehicle having a distance-related longitudinal dynamic control module and a brake control module, the distance-related longitudinal dynamic control module being capable of decelerating the motor vehicle to a standstill while maintaining a defined distance from a target object, the method comprising the acts of:
    defining a nominal brake torque for a brake control module via the longitudinal dynamic control module at least until a standstill of the motor vehicle is reached;
    detecting the standstill of the motor vehicle;
    at a defined first time after detecting the standstill of the motor vehicle, transmitting a transfer signal from the longitudinal dynamic control module to the brake control module whereby the brake control module effects a wheel brake torque in a manner of a parking brake function independent of a predefined nominal brake torque by the longitudinal dynamic control module;
    detecting issuance of a start command;
    at a defined second time after the detection of the start command, defining a nominal brake torque for the brake control module by the longitudinal dynamic control module, the nominal brake torque starting at an actual brake torque on hand at the defined second time and being used for decreasing the wheel brake torque, and
    wherein the defined first time after the detecting of the standstill is defined upon reaching a safety-nominal brake torque set by the brake control module through predefinition of the longitudinal dynamic control module after the standstill is detected.

14. The method according to claim 13, wherein the defined first time after the detecting of the standstill is directly after the standstill is detected.

15. The method according to claim 13, further comprising the act of setting the safety-nominal brake torque through predefinition of a first ramp.

16. The method according to claim 15, wherein the wheel brake torque is decreased through predefinition of a second ramp.

17. The method according to claim 16, further comprising the acts of after beginning the first ramp, starting a third ramp for reducing the drive torque to an idle value by the longitudinal dynamic control module based on the nominal drive torque.

18. The method according to claim 17, further comprising the act of beginning a fourth ramp in order to increase the drive torque by the longitudinal dynamic control module before the beginning of the second ramp.

* * * * *